June 13, 1933.  I. BLOCHER  1,914,238
AUTOMATIC FOUR-WHEEL BRAKE EQUALIZING MECHANISM
Filed Dec. 8, 1932  2 Sheets-Sheet 1
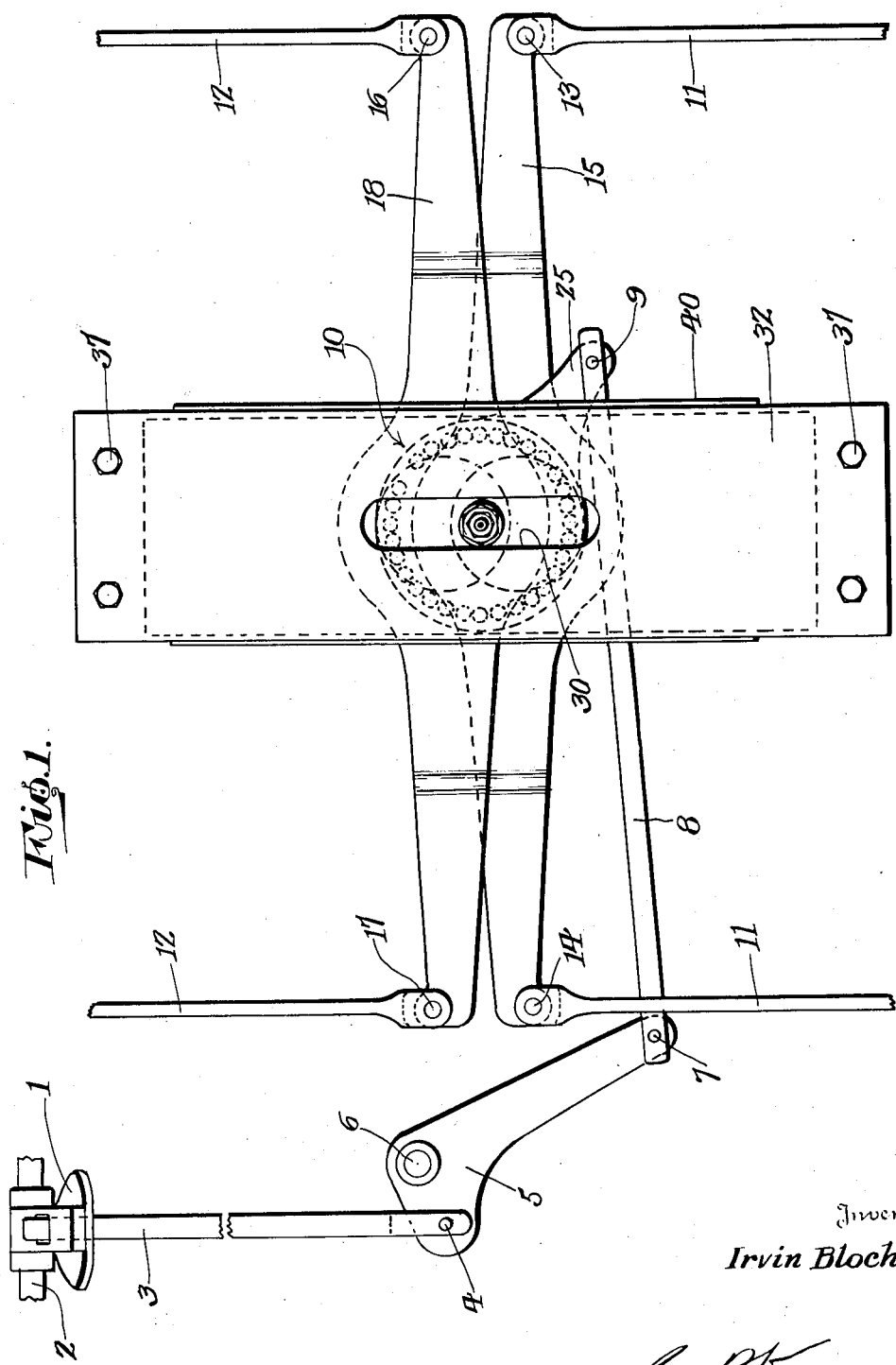
Inventor
Irvin Blocher
Geo. P. Kimmel
Attorney June 13, 1933.  I. BLOCHER  1,914,238
AUTOMATIC FOUR-WHEEL BRAKE EQUALIZING MECHANISM
Filed Dec. 8, 1932  2 Sheets-Sheet 2
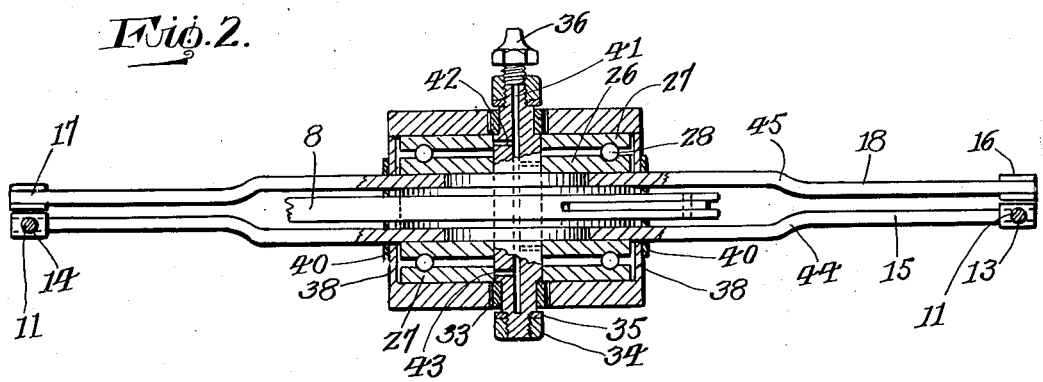
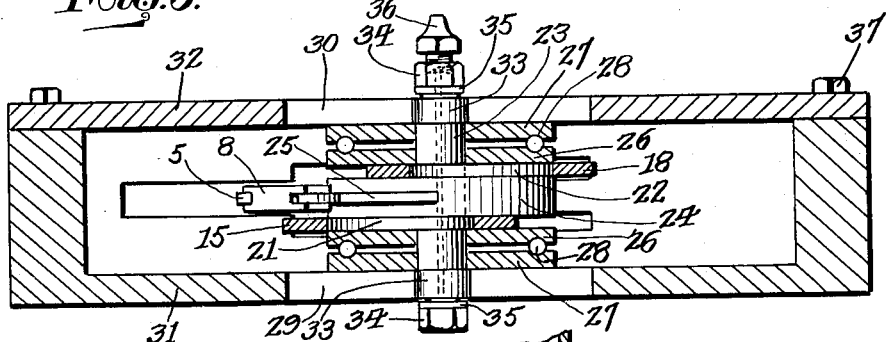
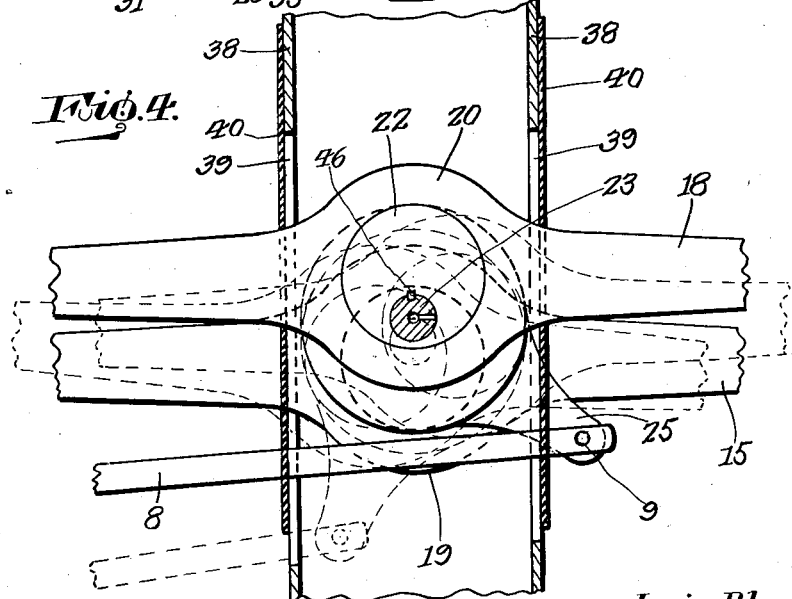
Inventor
*Irvin Blocher*
By *Geo. P. Kimmel*
Attorney Patented June 13, 1933

1,914,238

UNITED STATES PATENT OFFICE

IRVIN BLOCHER, OF LITTLE ROCK, ARKANSAS

AUTOMATIC FOUR-WHEEL BRAKE EQUALIZING MECHANISM

Application filed December 8, 1932. Serial No. 646,323.

This invention relates in general to brakes, and has particular reference to an actuating system for a set of simultaneously operated brakes.
In the past, a plurality of brakes have been actuated simultaneously by means of a single pedal or brake applying lever. However, in the absence of any automatic equalizing means, the adjustment of brakes operated by the single brake applying lever as just mentioned is a very difficult procedure, and one which can be properly and effectively carried out only by a person skilled in equalizing brakes. If for any reason one of the brakes of the system wears more rapidly than the other, as for instance if it should collect more grit and dirt than one of the other brakes, the brakes would get out of adjustment, and the necessity would arise for readjusting the brakes. Moreover, while the brakes are out of adjustment, and particularly when they are used on motor vehicles of the type commonly in use, it is extremely dangerous both to the occupants of the vehicle and to anyone in the immediate vicinity for the operator to apply the brakes. This is because the unequal braking on the various wheels of the automobile will cause the automobile to swerve from side to side and get out from under control.

A number of attempts have been made to provide automatic equalizing means for braking systems of this sort, but very few of them have proven to be practical. Moreover, in four wheel braking systems, the equalizing mechanisms which have been resorted to for equalizing all four of the brakes have at all times been cumbersome and complicated.

One of the most satisfactory of this type of equalizers for braking systems, involves the use of a floating actuating shaft. However, the problem of supporting the floating actuating shaft has proven to be a very serious one, and one which has not easily been solved.

One of the objects of this invention is therefore to provide a brake operating system for operating four brakes, in which the braking force applied to the actuators of the four brakes will be the same at all times regardless of the condition of wear of brake bands or position of the car.

Another object of this invention is to provide a brake operating system of the type just mentioned in which an equalizer is applied to the two rear brakes to equalize the pull between them, and in which an equalizer is applied to the two front brakes to equalize the pull between them, and in which these two equalizers are made to pull against each other so as to equalize the front and rear brakes.

Another object of this invention is to provide a brake operating system employing a floating shaft or actuating the same, and to provide an improved means for supporting said floating shaft in its proper position at all times.

Another object of this invention is to provide a brake operating mechanism of the type above mentioned in which the parts of the mechanism receiving the most wear, will be enclosed so as to keep out dirt and other foreign bodies.

Other objects and advantages of this invention will become apparent from the following description taken with the accompanying drawings, and I wish it to be distinctly understood that the same is by way of illustration only and is not to be taken as in any way limiting the scope of this invention. The scope of this invention is to be limited only by the prior art and by the terms of the appended claims.

Referring now to the drawings, in which like numerals indicate corresponding parts throughout:

Figure 1 is a plan view illustrating the brake operating system embodying this invention.

Figure 2 is a view partly in section showing the details of the actuating mechanism.

Figure 3 is a view similar to Figure 2 taken at right angles thereto.

Figure 4 is a horizontal section illustrating a portion of the operating mechanism.

Referring now more in detail to the drawings, there is shown in Figure 1 a pedal 1 having a part journaled on a shaft 2, and adapted to be pushed forwardly to exert a pull on the rod 3. The rod 3 is pivoted at 4 to the short arm of a bell crank 5. The bell crank 5 is in turn pivoted at 6 on some suitable support, and has pivotally connected at its outer end as at 7 a second rod 8. This rod 8 extends in a direction substantially at right angles to the rod 3, and in the case of the use of this device on an automobile, it will extend substantially at right angles to the longitudinal axis of the car. The other end of the rod 8 is pivoted as at 9 to the brake equalizing mechanism which is generally indicated by the numeral 10 in Figure 1.

Also shown in Figure 1 are the brake rods 11 adapted to actuate the brakes on the rear wheels, and brake rods 12 adapted to actuate the brakes on the front wheels. The brake rods 11 are pivotally connected as at 13 and 14 respectively to the ends of a brake beam 15 which extends transversely of the automobile.

The brake rods 12 are pivotally connected as at 16 and 17 to the beam 18 which likewise extends transversely of the automobile in substantially parallel relation to the beam 15, and closely adjacent thereto.

The beams 15 and 18 are each provided at their central portions with an enlargement 20 which is perforated to receive the eccentric portions 21 and 22 carried by the floating shaft 23. Between these eccentric portions, the shaft 23 is provided with an enlargement 24 serving to separate the beams 15 and 18, and having projecting therefrom the arm 25 to which the rod 8 is pivotally connected at 9. The eccentric portions 21 and 22 and the enlargement 24 are preferably integral with each other, being formed from a single piece of material. They are fixed to the shaft 23 for rotation therewith by means such as the key 46.

On the opposite sides of the eccentric portions 21 and 22, there are provided bearing members 26 which bear directly against the eccentric portions 21 and 22, and each of which is opposed by a second like bearing member 27 for a purpose to be hereinafter described. Antifriction means such as the balls 28 are preferably inserted between the bearing members 26 and 27.

For the purpose of supporting the floating shaft 23, a pair of slots 29 and 30 are provided respectively in the members 31 and 32 which form a housing for the mechanism just described. The shaft 23 is provided with a pair of bushings or bearing members 33 which are of such diameter as to fit with a very slight clearance within the slots 29 and 30. It will thus be seen that the shaft is supported in such a manner as to be movable longitudinally of the slots 29 and 30, but not movable in a direction at right angles to these slots.

For the purpose of holding the bearing members 33 carried by the shaft 23 in their proper positions, the shaft is provided on either end with a nut 34 and a washer member 35. The nut 34 which is positioned at the upper end of the shaft is so arranged as to receive the threaded end of a lubricating fixture 36 for a purpose to be later described.

The member 31 is provided with upstanding portions at its ends to which the member 32 is bolted by means of the bolts 37 so as to cause the members 31, 32 respectively to engage the outer faces of the bearing members 27. It is to be noted that these bearing members 27 are of considerably greater diameter than the width of the slots 29 and 30, and that they thereby serve to prevent the shaft 23 and the mechanism carried thereby from tilting one way or the other when the shaft is slid longitudinally in the slots 29 and 30. It is by virtue of this novel bearing arrangement that this floating shaft is rigidly and securely supported in its proper upright position at all times.

For the purpose of enclosing the mechanism which has just been described and preventing dust, dirt and other foreign particles from gumming up the bearings and other working parts, the member 31 is provided with walls 38 to enclose the side portions and form a housing for the mechanism. However, it is necessary to leave openings 39 in these walls for the purpose of allowing the beams 15 and 18, the lever arm 25 and the rod 8 to properly function. In order to more completely enclose the parts therefore, there has been provided a curtain or other suitable closure 40 which is made of flexible material in order to accommodate for the movement of the various parts.

The shaft 23 as above mentioned, is provided with a grease or lubricant fixture 36 at one of its ends. For the purpose of distributing the lubricant from this fixture, the shaft is provided with a duct 41 running substantially the entire length, and with any desirable number of lateral ducts 42 and 43 which distribute the lubricant to the parts requiring lubrication.

It is believed that the operation of the above described mechanism will be apparent. When the pedal 1 is depressed in applying the brake, it exerts a pull on the rod 3 which is transmitted to the rod 8 through the medium of the bell crank 5. The rod 8 by its endwise movement, serves to swing the member 25 about the shaft 23 as a pivot, thus rotating the shaft with its enlarged portion 24, and its eccentric portions 21 and 22. The bearing members 26 and 27, being free to rotate on the shaft 23 and lying between the eccentric portions and the frame members 31 and 32, may or may not rotate with the shaft, depending entirely on the distribution of pressure in applying the brakes. The shaft will be prevented from movement crosswise of the slots 29 and 30 by the bushing 33 fitting within the slots, but the shaft will be allowed to move longitudinally of these slots to equalize the force to be exerted on the brake rods 11 and 12.

When the shaft 23 is rotated thus rotating the eccentric portions 21 and 22, it is apparent that the beams 15 and 18 which are carried by the eccentric portions, will be drawn toward each other to tighten up on the brake rods 11 and 12 and apply the brakes. If it so happens that either of the brake rods 11 is tighter than the other, or that either of the brake rods 12 is tighter than the other, it is clear that the beam 15 or 18 as the case may be will pivot about its respective eccentric portion so as to equalize the pull on the two brake rods. Now if the pull on the pair of brake rods 11 should be different from the pull on the pair of brake rods 12, this would be equalized by a longitudinal movement of the shaft 23 and the eccentric portions thereof 21 and 22 on which the beams 15 and 18 are carried. It will thus be apparent that the same pull will be exerted on each of the brake rods 11 and 12.

It is worthy of note, that the beam 15 has been offset upwardly as at 44 to bring its outer end nearer to the beam 18, and that the beam 18 has likewise been offset downwardly at 45 to bring its outer end nearer to the beam 15. The purpose of this offsetting of the two beams will be readily apparent, in that it serves to minimize the torsional forces tending to tilt the shaft 23 within the slots 29 and 30. Although this tendency is resisted by the bearings carried by the shaft and bearing against the members 31 and 32, it will be appreciated that any force tending to tilt this shaft should be reduced wherever possible.

From the above description it will be apparent that a mechanism has been provided for carrying out all the objects of this invention, and that an automatic brake equalizing mechanism has been produced in which the pull exerted on a number of brakes simultaneously by a single brake actuator will be exactly equalized thus preventing the bad effect which usually results from improperly equalized brakes. Furthermore, it will be noted that there has been provided a simple and compact mechanism for equalizing the pull on the various brakes and that this mechanism has been provided with bearings and other parts adapted to make it a sturdy and wear resisting structure.

Furthermore, due to the compactness of the structure it has been possible to provide for enclosing the same so that substantially no dust and dirt can have access to the most important moving parts.

While it is apparent that various modifications and changes might be made in the details of the construction just described, it is to be distinctly understood that there is no intention of limiting this invention to this construction, but that it is within the spirit of this invention to make such modifications as may be found necessary or expedient.

What I claim is:—

1. In a brake applying mechanism, a floating operating shaft, an enlarged spacing member on said shaft, a pair of eccentric portions on said shaft on opposite sides of said spacing member and having their axes disposed on opposite sides of the axis of said shaft, brake actuating means rotatably mounted on said eccentric portions respectively and adapted to be moved thereby to actuate oppositely disposed brakes, and means for rotating said shaft.

2. In a brake applying mechanism, a floating operating shaft, a spacing enlargement on said shaft, a pair of eccentric portions on the shaft on opposite sides of said spacing enlargement and having their axes disposed on opposite sides of the axis of said shaft, brake actuating means rotatably mounted on said eccentric portions respectively and adapted to be moved thereby to actuate oppositely disposed brakes, and means on said spacing enlargement for rotating said shaft.

3. In a brake applying mechanism, a floating operating shaft, means supporting said shaft for floating movement in one path only, a spacing enlargement on said shaft, a pair of eccentric portions on the shaft on opposite sides of said spacing enlargement and having their axes disposed on opposite sides of the axis of said shaft, brake actuating means rotatably mounted on said eccentric portions respectively and adapted to be moved thereby to actuate oppositely disposed brakes, and means on said spacing enlargement for rotating said shaft.

4. In a brake applying mechanism, a floating operating shaft, a disc on said shaft, a pair of eccentric portions on the shaft on opposite sides of said disc and having their axes disposed on opposite sides of the axis of said shaft, brake actuating means rotatably mounted on said eccentric portions respectively and adapted to be moved thereby to actuate oppositely disposed brakes, means on opposite sides of said eccentric portions for supporting said shaft for floating movement in one path only, and means on said disc for rotating said shaft.

5. In a brake applying mechanism, a floating operating shaft, a disc on said shaft, a pair of eccentric portions on the shaft on opposite sides of said disc and having their axes disposed on opposite sides of the axis of said shaft, brake actuating means rotatably mounted on said eccentric portions respectively and adapted to be moved in opposite directions thereby to actuate oppositely disposed brakes, means on opposite sides of said eccentric portions for supporting said shaft for floating movement in the direction of pull on said actuating means only, and means on said disc for rotating said shaft.

6. In a brake applying mechanism, a floating operating shaft, slotted means supporting said shaft for floating movement in one path only, a disc on said shaft, a pair of eccentric portions on the shaft on opposite sides of said disc and having their axes disposed on opposite sides of the axis of said shaft, brake actuating means rotatably mounted on said eccentric portions respectively and adapted to be moved thereby to actuate oppositely disposed brakes, and means on said disc for rotating said shaft.

7. In a brake applying mechanism, a floating operating shaft, a spacing enlargement on said shaft, a pair of eccentric portions on the shaft on opposite sides of said spacing enlargement and having their axes disposed on opposite sides of the axis of said shaft, brake actuating means rotatably mounted on said eccentric portions respectively and adapted to be moved in opposite directions thereby to actuate oppositely disposed brakes, means on opposite sides of said eccentric portions supporting said shaft for floating movement in the direction of pull on said brake actuating means only, means for preventing said shaft from tilting about a transverse axis, and means on said spacing enlargement for rotating said shaft.

8. In a brake applying mechanism, a floating operating shaft, a disc on said shaft, a pair of eccentric portions on the shaft on opposite sides of said disc and having their axes disposed on opposite sides of the axis of said shaft, brake actuating means rotatably mounted on said eccentric portions respectively and adapted to be moved in opposite directions thereby to actuate oppositely disposed brakes, spaced slotted means supporting said shaft for floating movement in the direction of pull on said brake actuating means only, and thrust bearings of relatively large diameter surrounding said shaft between said eccentric portions and said slotted supporting means respectively to prevent said shaft from tilting in said slots about a transverse axis, and means on said disc for rotating said shaft.

9. In a brake applying mechanism, a floating operating shaft, an enlarged spacing member on said shaft, a pair of eccentric portions on said shaft on opposite sides of said spacing member and having their axes disposed on opposite sides of the axis of said shaft, brake actuating beams rotatably supported at their central portions on said eccentric portions respectively, a brake rod connected to each end of each of said beams to be actuated thereby whereby the pull on each brake rod to operate the same will be balanced against the pull on the other brake rod connected to the same beam to equalize the pull on the two brake rods, and whereby the pull on each beam will be balanced against the pull on the other beam to equalize all four brakes, and means for rotating said shaft.

10. In a brake applying mechanism, a floating operating shaft, an enlarged spacing member on said shaft, a pair of eccentric portions on said shaft on opposite sides of said spacing member and having their axes disposed on opposite sides of the axis of said shaft, brake actuating beams rotatably mounted at their respective centers on said eccentric portions, a brake rod connected to each end of each of said beams to operate oppositely disposed brakes, each of said beams having its ends offset toward the other beam to bring the pull on the beams to substantially the same plane, and means for rotating said shaft.

In testimony whereof, I affix my signature hereto.

IRVIN BLOCHER.